Jan. 5, 1926.                                   1,568,772
H. RUBIN
ADJUSTABLE HOT AND COLD WATER MIXER, WITH FILTER
AND DELIVERY NOZZLE, FOR SINKS, ETC
Filed April 19, 1921
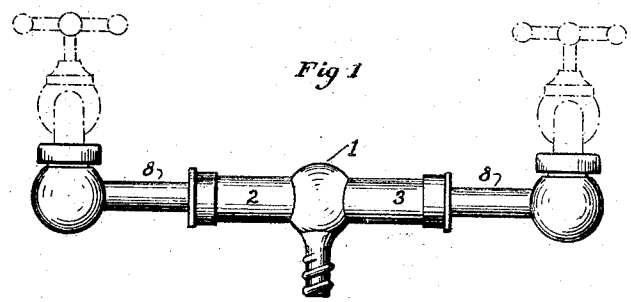
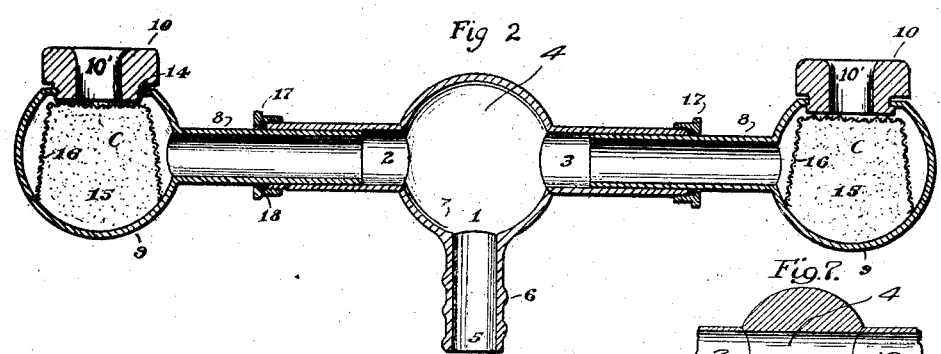
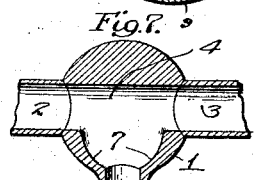
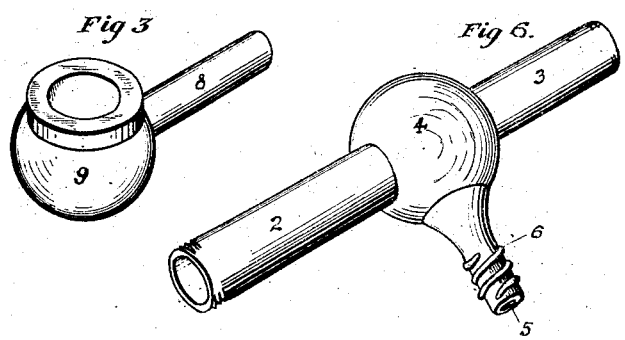
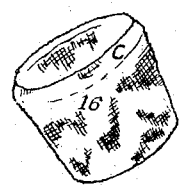
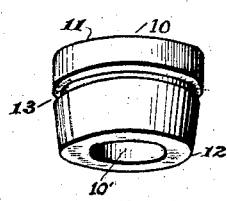

Patented Jan. 5, 1926.

1,568,772

UNITED STATES PATENT OFFICE.

HYMAN RUBIN, OF NEW YORK, N. Y.

ADJUSTABLE HOT AND COLD WATER MIXER, WITH FILTER AND DELIVERY NOZZLE, FOR SINKS, ETC.

Application filed April 19, 1921. Serial No. 462,518.

*To all whom it may concern:*

Be it known that I, HYMAN RUBIN, a citizen of the United States, and a resident of the borough of Bronx, county of Bronx, city and State of New York, have invented a certain new and useful Adjustable Hot and Cold Water Mixer, with Filter and Delivery Nozzle, for Sinks, Etc., of which the following is such a full, clear, and exact description as will enable anyone skilled in the art to which it appertains to make and use the same, reference being had to the accompanying drawing, which forms part of this application.

The object of my invention is to produce a simple and cheap hot and cold water mixer and delivery spout, of long life, etc., which may be lengthened or shortened, so as to be almost instantly attached to hot and cold-water faucets, situated at different distances apart; and which may also be used with faucets of different diameters; in all cases where it is desired to obtain flowing water of many different widely varying temperatures at short intervals.

My said invention is fully shown and described in the following specification, of which the accompanying drawing forms a part, wherein similar letters or numerals of reference designate like or equivalent parts wherever found throughout the several views, and in which:—

Figure 1, is a front face view of one of my said new and improved water-mixers, as the same appears in position upon a hot and a cold water faucet, ready to deliver cold water, boiling water, or mingled hot and cold water of all minute gradations of temperatures between those points, by simple manipulation of the actuating handles of the two faucets.

Figure 2, is a view of the water-mixer shown in position in Fig. 1, removed from the faucets, taken in vertical central longitudinal section, and upon a somewhat enlarged scale from that of Fig. 1; and Figs. 3 to 6 inclusive are views in perspective, of several various elements and separate parts, making up and composing my said improved water-mixer and delivery nozzle, as they appear when disassembled.

Fig. 7 is a vertical longitudinal sectional view of a modified form of combined mixing chamber and delivery nozzle.

Referring to the drawing:

My said new and improved hot and cold water mixer, comprises a central combined mixer-chamber and delivery nozzle-piece 1, usually and preferably of brass, or other suitable metal, cast integral, or it may be made up of separate pieces formed to shape in any suitable manner, and then brazed or welded together in any desired way so as to be substantially integral, and such nozzle-piece is usually and preferably of the hollow three-way T-type, shown in Fig. 2, having the hot-water inlet at one end of the T, say the left-hand end 2; and the cold-water inlet at the right-hand end 3, which are separated by the mixing-chamber 4, usually and preferably of the enlarged substantially spherical form shown, in Fig. 2; from the bottom of which depends the delivery-nozzle, 5, usually and preferably provided with the exterior high-pitch screw-thread 6, to facilitate the attachment of the hose of a spraying-nozzle, etc., when desired. And while I prefer the use of the enlarged mixing-chamber, in some cases for cheapness of construction it may be but an extension of the circular end bores as shown in Fig. 7 but in any event the delivery-nozzle bore is preferably flared funnel-like at the top, as indicated at 7, of Fig. 2.

Fitting snugly in each inlet of the nozzle-piece so as to slide in and out, is an inlet-pipe 8, preferably formed integral with an inlet filter-bulb 9, which is open at the top, to receive the soft-rubber faucet securing ring 10, which I prefer to use for securing the device to both faucets or stop-cocks, although other suitable securing means may be employed if desired.

Such faucet securing ring 10 is preferably of the shape clearly shown in section in Fig. 2, and in persepctive in Fig. 4, having an enlarged outer cylindrical base-portion 11, between which and a bottom smaller diametered frusto-conical inner portion 12, is an annular securing-groove 13, into which tightly fits, when the same is in position, the annular edge of the top opening 14, of the filter-bulb chamber, so as to secure the two together against accidental displacement; all as clearly shown in Fig. 2.

Usually and preferably but not in all cases necessarily, a filter, of porous or filtering material in granular form 15, entirely fills the filter chamber of the bulb 9; and such material is kept from being washed away thru the delivery nozzle by an inverted filter-gauze thimble 16, preferably of the shape shown, the depending annular wall of which covers the outlet from the bulb-chamber, while its central top portion lies in the path of the water entering the bulb-chamber C, thru the inlet orifice 10' of the soft-rubber faucet securing-ring 10, which may be made of such diameter as to fit various faucets, all as clearly indicated in Fig. 2.

In order to secure the device upon the hot and cold water faucets or stop-cocks, as shown in Fig. 1, the two securing gland-nuts 17, screwed upon the threaded ends of the nozzle inlet-pipes 2 and 3 formed on the head of such T-nozzle, are loosened by partial unscrewing, and the bulbs positioned the proper distance apart, and the soft-rubber securing-rings 10, are then forced tightly upon their respective faucets, after which the gland-nuts 17 are screwed tightly home so as to compress tightly the gland gasket-rings 18, so as to prevent leakage at the gland-joints. The operation of the device is self-evident from the description.

It is evident that many changes in the construction of the several parts of the device, and in the particular combination, and arrangement thereof shown, may be made without departing from the scope of my invention, and I therefore do not intend to limit myself strictly to the exact form or forms shown.

I claim:

1. A device of the class described, comprising a central T shaped three-way pipe member, having a delivery nozzle, provided with screw threads at the ends of the horizontal head portion; a water inlet member carried at each end of the horizontal head portion and adjustable longitudinally; a screw-gland member for securing the same in any desired position to such head portion with a water tight joint, and means at the outer ends of the inlet members for securing one to a hot-water and the other to a cold-water supply faucet with a water-tight joint; each inlet member having an enlarged body portion forming a filter bulb and a filter member located in each filter-bulb comprising an inverted perforated thimble, having a suitable filling of granular replaceable filtering material.

2. A device of the class described, comprising a central T shaped three-way pipe member, having a delivery nozzle, provided with screw threads at the ends of the horizontal head portion and having an enlarged central mixing-chamber; a water inlet member carried at each end of the horizontal head portion and adjustable longitudinally; a screw-gland member for securing the same in any desired position to such head portion with a water-tight joint, and means at the outer ends of the inlet members for securing one to a hot-water and the other to a cold-water supply faucet with a water-tight joint; each inlet member having an enlarged body portion forming a filter bulb and a filter member located in each filter-bulb comprising an inverted perforated thimble, having a suitable filling of granular filtering material.

HYMAN RUBIN.